Figure 8:
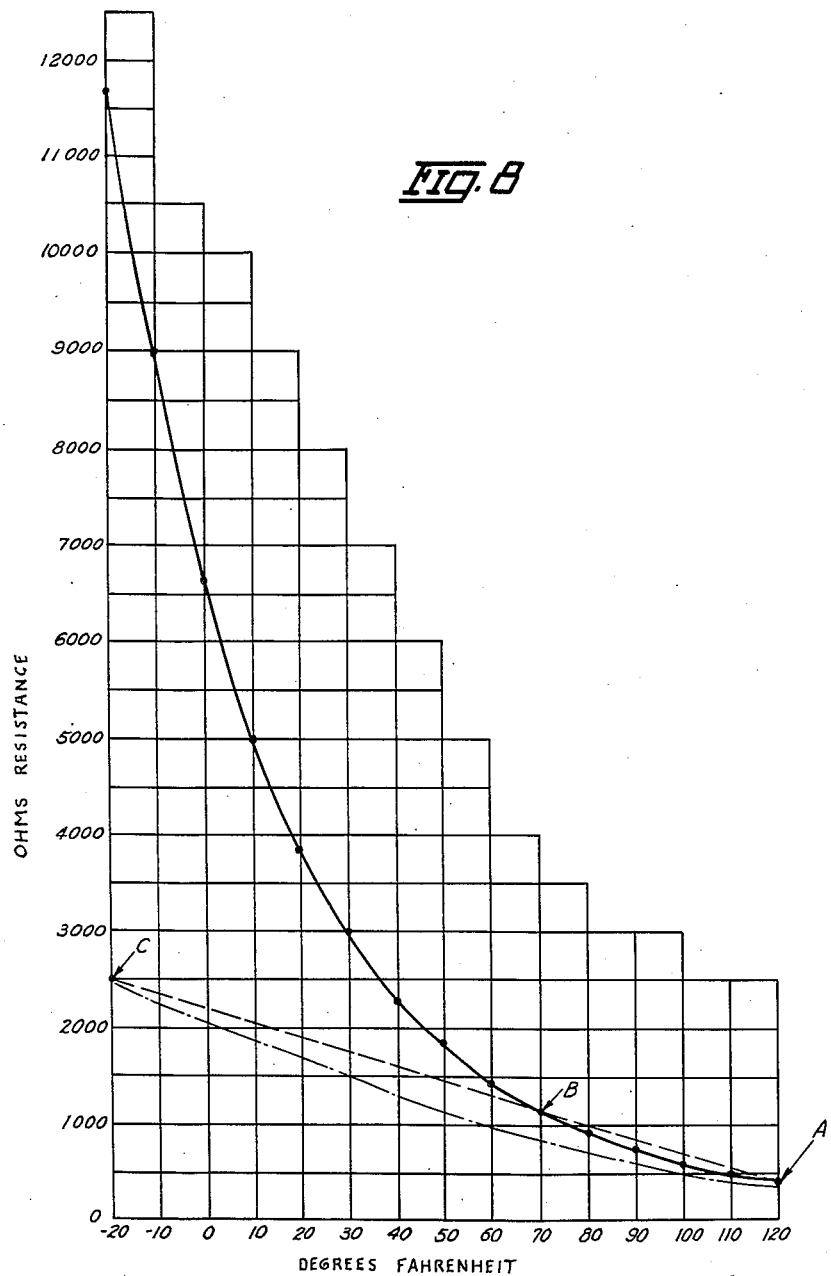

May 29, 1962 J. T. BEESTON, JR 3,036,464
ELECTRONIC THERMOMETER
Filed Jan. 29, 1959 3 Sheets-Sheet 1
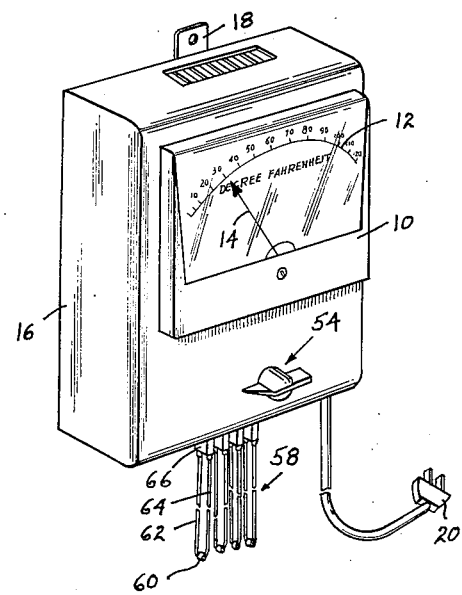
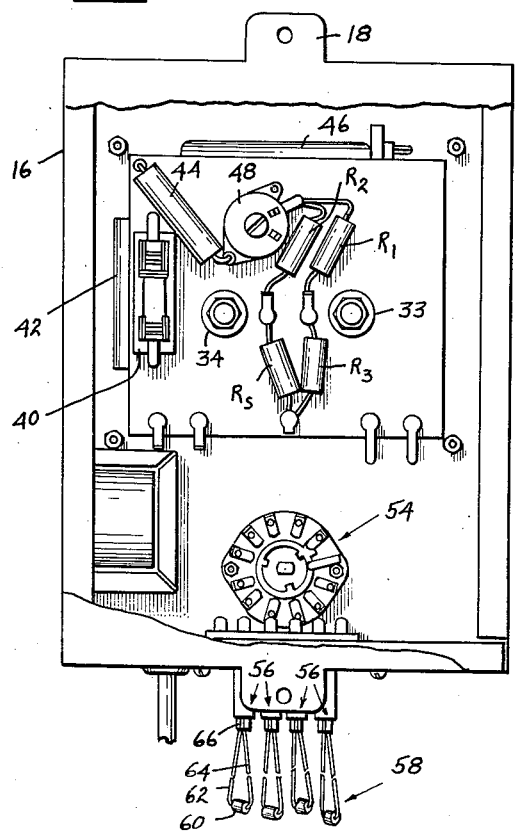
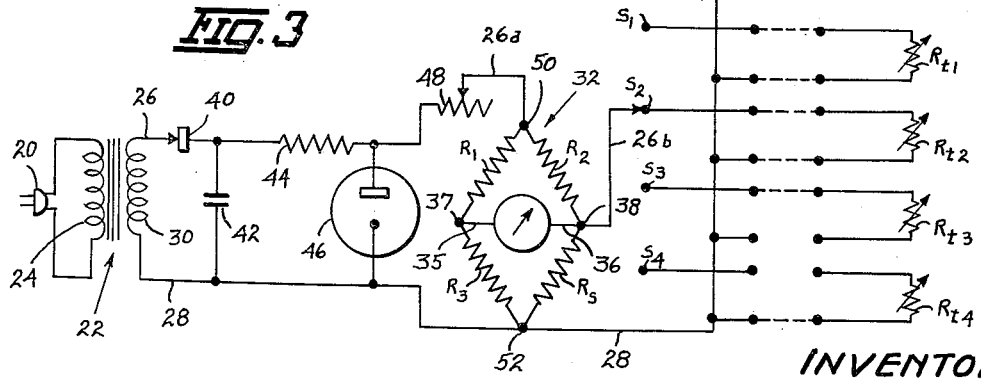
INVENTOR.
JOHN T. BEESTON, JR.
BY Morton S. Adler
ATTORNEY.

May 29, 1962　　　J. T. BEESTON, JR　　　3,036,464
ELECTRONIC THERMOMETER
Filed Jan. 29, 1959　　　　　　　　　　3 Sheets-Sheet 2
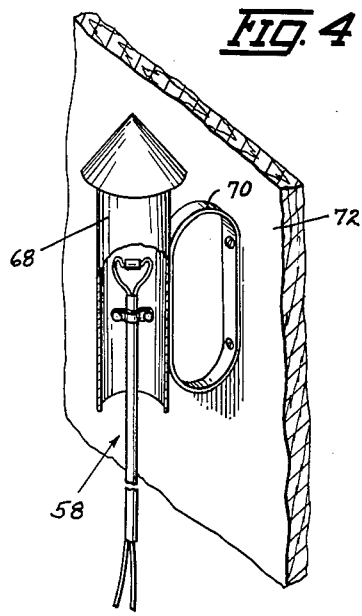
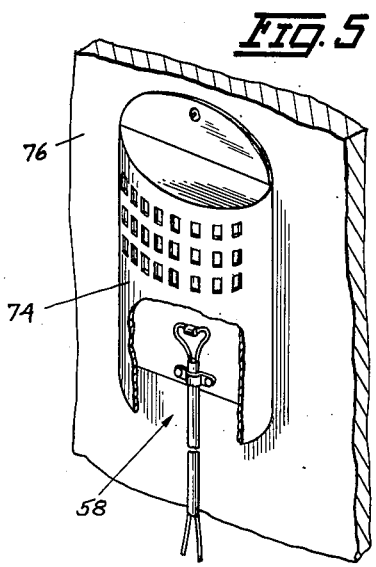
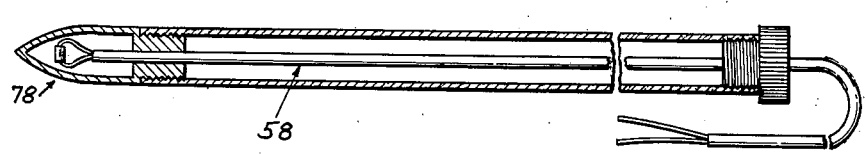
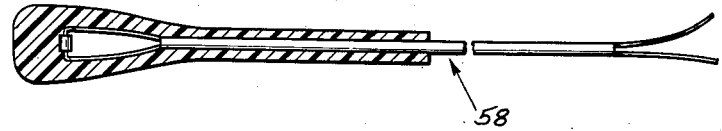
INVENTOR
JOHN T. BEESTON, JR.
BY *Morton S. Adler*
ATTORNEY.

3,036,464
        ELECTRONIC THERMOMETER
John T. Beeston, Jr., 712 32nd St., Des Moines, Iowa
        Filed Jan. 29, 1959, Ser. No. 789,887
               3 Claims. (Cl. 73—342)

My invention relates to electronic apparatus for indicating temperatures and more particularly concerns an electronic thermometer having an improved circuit for measuring the changes in electrical resistance of thermal material relative to ambient temperatures and translating such resistance into direct temperature degree readings.

One of the important objects contemplated herein is the provision of an electronic thermometer of the above class which will provide temperature readings for both local and remote locations. In this respect it is my purpose to provide a single temperature indicating scale and a plurality of thermal sensing elements capable of being dispersed in a variety of remote locations and each electrically connected to the scale through a multiple switch.

Another object is to employ a thermistor, which is known to have a large negative temperature coefficient and nonlinear resistance characteristics, with an improved circuit in a thermometer so that the measurement of resistance is linear in relation to temperature.

A further important object herein is to develop a mathematical expression that will provide all values of indicator current on a given current scale and all translated resistance values between given temperature extremities calibrated to correspond with such scale.

Still further objects are to provide an electronic thermometer as characterized that has high sensitivity to relative minute temperature changes, is stable, dependable, extremely accurate and requires a minimum of maintenance.

Other objects and advantages of this invention reside in the details of construction and correlation of the various parts and will be apparent as the description proceeds.

This invention consists of novel parts and combination of parts to be hereinafter described whereby the objects set forth are attained, as pointed out in the claims, and illustrated in the accompanying drawings, in which:

FIG. 1 is a perspective front view of my new electronic thermometer,

FIG. 2 is an enlarged elevational back view thereof with the cover broken away to illustrate the construction, FIG. 3 is a circuit diagram, FIGS. 4 and 5 are illustrative forms for mounting the thermal sensing element to measure air temperatures, FIGS. 6 and 7 are illustrative forms of probes in which the thermal sensing element may be arranged, and FIG. 8 is a resistance temperature curve chart for the thermistor used with this thermometer.

This invention utilizes a thermistor as a thermal sensing element which is characterized by its large negative resistance temperature co-efficient. Since another characteristic of the thermistor is its non-linear resistance, I have shunted it was a second resistance having a value chosen to combine with the resistance of the thermistor over a given temperature range in such a manner as will later be described more in detail, that the combined resistance of the thermistor and its shunt resistor is more nearly in linear relation with temperature than can be accomplished by use of a thermistor alone. This linearized combination of the thermistor and shunt resistance is placed in one arm of a Wheatstone bridge whereby an indicating device of any selected current scale may be used and can be brought to zero at one desired temperature limit with resistance values of the other resistances that make up the bridge determining the full scale reading at the other desired temperature limit. This arrangement obtains complete use of the indicator from zero to its maximum value and places the desired temperature limits at zero and maximum on the indicator with very nearly linear increments between such limits. It will thus be appreciated that for purposes of temperature readings, the advantages of the sensitivity of a thermistor is utilized and the disadvantage of non-linear resistance is overcome to register the readings on an undistorted or linear scale. Such an indicator is used with a multiple switch means connected to a plurality of thermistors that can be placed in any desired locations remote from the indicator whereby the temperature at such remote stations can be selectively read at a central point.

Referring now to the drawings an indicator is designated generally by the numeral 10 and includes the temperature scale 12 and pointer needle 14. Indicator 10 is mounted to the front side of a suitable box or housing 16 that is provided with wall mounting brackets 18 and contains the circuit shown in FIG. 3. The indicator 10 should provide high sensitivity, stability and accuracy and while the same may be one of special design, if desired, I have found that a standard one milliampere recording instrument satisfies all of these requirements and can for all practical purposes herein be used without changing the circuitry already present therein. Such instruments are commercially available so that costs of manufacture can be held at a minimum by using them. The standard 0–1 milliampere recording instrument has a scale length of four and one half (4½) inches which provides adequate length for proper legibility and reading accuracy for a temperature range of —20° F. to 120° F. in 2° calibrations. Fahrenheit measurement has been arbitrarily selected to illustrate this thermometer and it will be understood that calibrations for centigrade or absolute degrees can be used if desired with the indicating circuits adjusted accordingly as will later appear. With such a 0–1 milliampere scale, the meter current must go to zero at —20° F. and to the full scale reading of one milliampere at 120° F. This is accomplished by the circuit in FIG. 3 to which reference is now made.

This thermometer is designed to operate from current supplied from a standard 115 v. A.C. source to which it is connected by plug 20 and to avoid any danger from shock or electrocution from the handling of wires, direct connection between the thermometer circuit and the A.C. source is eliminated by use of a one to one isolation transformer 22. Plug 20 connects to the primary 24 of transformer 22 and leads 26 and 28 of the thermometer circuit connect to the secondary 30 thereof. This arrangement permits the transfer of energy from the A.C. source to the thermometer circuit in a well known manner making the thermometer completely safe from the hazards indicated. Current in the circuit defined by leads 26 and 28 is delivered to the indicator 10 through a Wheatstone bridge 32 which comprises the upper arms or branches designated as $R_1$ and $R_2$ and the lower arms or branches $R_3$ and $R_s$. Terminals 33 and 34 of indicator 10 are connected by the respective leads 35 and 36 to the respective junction points 37 and 38 between the upper and lower branches of the bridge 32. Between bridge 32 and transformer 22 and in line 26 in the direction of current flow from transformer 22, I have first placed a rectifier and filter 40 to change the A.C. source to filtered D.C. to accommodate the choice of the D.C. indicator 10. A condenser 42 is then connected across lines 26 and 28 followed by a resistor 44 in line 26 and then a voltage regulator tube 46 across lines 26 and 28. The need for regulator 46 is dictated by the inherent voltage irregularities of most 115 v. plug-in sources. In some areas these variations are relatively large and would result in inaccurate readings if measures were not taken to stabilize the working voltage of the indicator. Thus use of the series resistance 44 in conjunction with the parallel gas filled tube 46 provides a simple but reliable voltage regulator that will provide a relatively long period of trouble-free service and at the same time adjust for a wide margin of A.C. variation.

From regulator 46, lead 26 connects to a screwdriver adjustable variable resistor 48 which is connected by lead 26a to junction point 50 between bridge arms $R_1$ and $R_2$. Lead 28 connects to junction point 52 between bridge arms $R_3$ and $R_s$. With the circuit so far described it is one of the objects herein to provide a plurality of like thermistors, each separately connectible in parallel with arm $R_s$ of bridge 32 and for this purpose a multiple switch means illustrated in FIG. 2 as a rotary switch 54 is mounted in housing 16 and is electrically connected by lead 26b to junction point 38 and by lead 28 to junction point 52 of bridge 32 (FIG. 3). It will be understood that the number of switch positions usable is limited only by the number of pairs of contacts on the multiple switch selected and for purposes of illustration I have shown only four different positions designated as $S_1$, $S_2$, $S_3$ and $S_4$. Thus as shown in FIG. 3 the multiple switch 54 provides means for selectively placing any one of the switch positions $S_1$–$S_4$ in series with the thermometer circuit and a plug-in socket member designated as 56 is provided in the lower end of housing 16 for each switch position and is electrically connected to one of the respective switch positions on switch 54. For attachment to the several switches $S_1$ to $S_4$ through the corresponding sockets 56, I provide a thermistor assembly shown generally in FIG. 2 by the numeral 58 and comprising a thermistor 60 connected by a pair of leads 62 and 64 to a plug 66. The length of leads 62 and 64 will be governed by the distance from indicator 10 to the remote location of the thermistor 60 and because of the high electrical resistance values and large temperature coefficients of the thermistor element, such lead lengths up to a nominal one thousand feet can be disregarded from the standpoint of electrical considerations.

Thermistor assemblies 58 may be used in a wide variety of situations and illustrative of such uses are those shown in FIGS. 4–7. In FIG. 4 an out-of-doors location is shown with assembly 58 placed in a shielded cover or housing 68 attachable by brackets 70 to a wall 72. An indoors mounting is shown in FIG. 5 where a ventilated cover 74 protects assembly 58 and is attachable to wall 76. FIG. 6 illustrates a probe 78 for suitably housing assembly 58 whereby it can be inserted into dry materials or submersed in liquids and FIG. 7 shows assembly 58 cast in epoxy resins of any desired shape to fit the particular application required.

Each of the thermistor assemblies 58 will be of like construction except for the length of leads 62 and 64 as the circumstances require, and each will function the same electrically when incorporated into the thermometer circuit by the switch member 54. For purposes of further description of the operation of such circuits, the several assemblies 58 are shown in the circuit diagram of FIG. 3 as $R_{t1}$, $R_{t2}$, $R_{t3}$ and $R_{t4}$ to correspond to the respective switch positions of $S_1$ to $S_4$ inclusive. A calibrating resistance designated $R_x$ having a fixed resistance at a given temperature to correspond to the resistance of the selected thermistor at such temperature is provided for adjusting the indicator 10 without reference to the thermistor, if desired. In utilizing the resistance characteristics of the thermistor as pointed out previously, it must be understood that thermistors have two general types of application, namely resistance relative to ambient temperature, and resistance relative to temperatures created by current in the circuit in which it is used. Since the application here is in relation to ambient temperature, the selection of an indicator where the full scale is to be used should preferably be limited to such instruments where the current flowing through the thermistor will not heat it sufficiently to affect the resistance values for the purposes intended. If the indicator used is within such limits, it will then be unnecessary to adjust the circuit for resistance values arising from current through the thermistor as such values will not appreciably affect the accuracy of the thermometer reading.

It should also be pointed out that thermistors are manufactured in different grades with different values and characteristics which are usually adequately charted by the manufacturer to indicate specific values under given conditions. The thermistor which I have selected according to the resistance ratio temperature curve relating thereto (FIG. 8) has a resistance value of 1000 ohms at 25° C. or 77° F. and with current up to twenty milliamperes will not be heated sufficiently that such current produced heat need be adjusted for in the circumstances here disclosed. Having thus arbitrarily selected a 0–1 milliampere indicator with the purpose of utilizing its full four and one half inch scale between temperature limits of −20° F. to 120° F. it is one of my purposes to evolve a mathematical expression that will give all values of indicator current from zero to one milliampere for all translated resistance values between the selected temperature limits. Such expression includes resistance values required in the Wheatstone bridge employed in the thermometer circuit and in addition includes resistance values used in parallel with one branch of the bridge whereby the non-linear characteristics of the thermistor can be changed to obtain optimum linearity in order that calibrations on the indicator can be set at maximum spacing for better legibility. To utilize the sensitivity of the thermistor for the purposes set forth without linearizing its resistance values would result in an indicator scale having closely bunched calibrations for high degree readings and relatively widely separated calibrations for low degree readings.

As indicated above, the thermistor whose electrical resistance characteristics are exponential with temperature changes has been placed in parallel with one branch of the Wheatstone bridge to give a new resistance curve that obtains optimum linearity relative to ambient temperature variations. The value of such bridge arm resistance must be determined relative to the particular temperature curve of the thermistor used and also relative to the particular indicator and the formula which I have evolved may be used not only for determining specific values in the example shown, but can be used for determining comparable values with any thermistor or indicator having different known values.

FIG. 8 shows, as an illustration, the temperature curve of the thermistor which I have selected and shows the variations of electrical resistance therefor in an arbitrarily set variable temperature range from −20° F. to 120° F. which may be accommodated satisfactorily on a full scale of the indicator selected. Examination of the curve in FIG. 8 shows that between 120° F. and 70° F. the slope changes very gradually and from 70° F. to −20° F. it increases very rapidly indicating the non-linear characteristic of the thermistor material. A fixed resistance of proper value placed in parallel with the thermistor will change the slope between 70° F. and −20° F. to correspond to the slope between 120° F. and 70° F. and thus linearize the curve. To determine the value for such resistance a straight line (shown broken in FIG. 8) is drawn through points 120° F. and 70° F. on the temperature curve and designated respectively as A and B, A being further expressed as the point where $T_a$ (temperature) equals 120° F. and $R_a$ (ohms resistance) equals 422, and B as $T_b=70$ and $R_b=1160$. The slope of the line connecting points A and B is thus expressed as $$m = \frac{R_a - R_b}{T_a - T_b}$$

and substituting the respective values for $R_a$, $R_b$, $T_a$ and $T_b$ we find $$m = \frac{422 - 1160}{120 - 70} = -14.75$$

Using the $m$ value determined, a point C can be found where the straight line through 120° F. and 70° F. intersects $T_c$ at the other end of the scale which is —20° F. To solve then for $R_c$ which is the value of the fixed resistance in the bridge at —20° F., I use the expression $$R_c = -m(T_b - T_c) + R_b$$

and substituting the respective values as given above, $$R_c = -(-14.75)(70-(-20)) + 1160$$
$$R_c = 2488 \text{ ohms}$$

C is now defined as a point where $T_c = -20°$ F. and $R_c = 2488$ ohms. Since the thermistor as shown on the temperature curve has a resistance of 12,200 ohms at —20° F., such resistance at that temperature must be reduced to the value determined for $R_c$ and the value of the shunt parallel resistance ($R_s$) is calculated from the expression of the two resistances $R_t$ and $R_s$ (FIG. 3) in parallel. For this purpose $$R_s = \frac{R_c R_t}{R_t - R_c}$$

$R_s$ is thus the required resistance to correct $R_t$ to $R_c$ with $R_t$ being the thermistor resistance at —20° F. (12,200 ohms) and $R_c$ being determined above as 2488 ohms. Thus $$R_s = \frac{(2488)(12200)}{12200 - 2488}$$

$$R_s = 3130 \text{ ohms}$$

The thermistor thus selected which has an exponential curve as shown in FIG. 8 when shunted by $R_s$ having a value of 3130 ohms obtains a nearly straight temperature curve as shown. For practical purposes, however, I have used 3000 ohms for $R_s$ because of its commercial availability. The same procedures and the same formulae shown may be applied to the temperature curve of any selected thermistor to determine the value of $R_s$.

Examination of the thermistor resistance-temperature curve shows it to be of exponential shape where resistance value of the thermal unit is given in terms of temperature and its physical constants. The general mathematical expression will be $$R_t = A e^{f(T)}$$

Where:
$R_t$ = Resistance of the thermal unit in ohms.
$A$ = Physical constant of the thermal unit.
$e^{f(T)}$ = Exponential factor governed by the value of degrees temperature.

When fitting a general expression to a specific curve like the one representing the thermistor material, the exponent $f(T)$ is modified with constants necessary to make the final expression represent fully the curve at all points along its path. The expression $f(T)$, or function of T, is used because the exact equation is dependent on the temperature scale used, as is appreciated by those of ordinary skill in the art. The modified form representing the thermistor material used is $$R_t = 1000 e^{\frac{77-T}{40.75+.075T}}$$

Here, temperature T in degrees Fahrenheit will resolve directly into ohms resistance. All that remains is to place each factor in a final expression so that desired temperature values when inserted reveal the exact indicator current for that temperature.

The final expression is:

$$i_m = \frac{ER_2 R_3 - ER_1 \frac{1000 e^{\frac{77-T}{40.75+.075T}} R_s}{1000 e^{\frac{77-T}{40.75+.075T}} + R_s}}{\frac{1000 e^{\frac{77-T}{40.75+.075T}} R_s}{1000 e^{\frac{77-T}{40.75+.075T}} + R_s}(R_m R_1 + R_m R_3 + R_1 R_2 + R_2 R_3 + R_1 R_3) + R_m R_1 R_2 + R_m R_2 R_3 + R_1 R_2 R_3}$$

In the above expression:
E equals applied voltage across circuit, $R_1$ and $R_2$ equals current limiting resistances for full scale reading of $i_m$, $R_3$ equals balance resistance to give zero current at low temperature limit, $R_m$ equals resistance of the indicating meter, $R_s$ equals parallel resistance used to linearize the indicator scale, T equals temperature in degrees Fahrenheit, and $i_m$ equal indicator current for given temperature in degrees Fahrenheit.

By the above expressions it will be appreciated that any given indicator scale can be employed with any selected thermistor and the circuit constructed so that the scale can be calibrated linearly for accurate direct temperature readings.

The term "full range of temperatures" as used in the appended claims means a range of temperatures between substantially different extremes, i.e. a range of temperatures varying in the order of 100° F. or more as opposed to varying in the order of 10° F. or less.

It will be understood that the phraseology employed herein is for the purpose of description and not for limitation and that modifications and changes in the construction and arrangement of this invention can be made within the scope of what is claimed, without departing from the spirit and purpose thereof. It is thus intended to cover by the claims, any modified forms of structure or mechanical equivalents which may be reasonably included within their scope.

I claim:
1. An electronic thermometer for measuring a full range of temperatures at a plurality of different locations, comprising the combination of a Wheatstone bridge circuit including a plurality of resistance branches and having input terminals and output terminals, means for supplying a regulated D.C. voltage across said input terminals, and meter means coupled across the output terminals of said bridge circuit, wherein said meter means includes a linear temperature scale and an indicating arm adapted to move across said scale to indicate temperatures in response to a difference in potential across said output terminals of said bridge circuit, and wherein one of said branches of said Wheatstone bridge circuit comprises a parallel network for causing linear differences of potential across said output terminals of said bridge circuit in response to changes of temperatures being measured, said parallel network including a single shunt resistance, a plurality of non-linear temperature sensitive resistances adapted to be disposed at various locations, and switching means for selectively coupling any one of said temperature sensitive resistances in parallel with said shunt resistance.

2. An electronic thermometer for measuring a full range of temperatures at a plurality of different locations comprising the combination of a Wheatstone bridge including a plurality of resistance branches and having input terminals and output terminals, means for supplying a regulated D.C. voltage across said input terminals, and meter means coupled across the output terminals of said bridge circuit, wherein said meter means includes a linear temperature scale and an indicating arm adapted to move across said scale to indicate temperatures in response to a difference in potential across said output terminals of said bridge circuit, and wherein one of said branches of said Wheatstone bridge circuit comprises a parallel network for causing linear differences of potential across said output terminals of said bridge circuit in response to changes in temperatures being measured, said parallel network including a single shunt resistance, a plurality of non-linear temperature sensitive resistances, and a single multi-terminal switch for selectively coupling any one of said temperature sensitive resistances in parallel with said shunt resistance, said shunt resistance having a value of $R_s$ as given by the formula $$R_s = \frac{R_c R_t}{R_t - R_c}$$

where $R_c$ is equal to the total resistance of said parallel network when said indicating arm of said meter means coincides with the minimum reading on said scale, and where $R_t$ is the resistance of said temperature sensitive resistances as given by the formula $R_t = Ae^{t(T)}$, where A is equal to the physical constant of the temperature sensitive resistance, $e$ is the base of natural logarithms, and T is the temperature of the temperature sensitive resistance.

3. An electronic thermometer as defined in claim 2 and further including variable resistance means for adjusting the magnitude of D.C. voltage supplied across said input terminals, said variable resistance means being coupled in series with said means for supplying a regulated D.C. voltage.

References Cited in the file of this patent

UNITED STATES PATENTS

| | | |
|---|---|---|
| 2,271,975 | Hall | Feb. 3, 1942 |
| 2,635,137 | Basham | Apr. 14, 1953 |
| 2,938,385 | Mack | May 31, 1960 |

OTHER REFERENCES

Suchet: "Techniques Electroniques," Measures, August 1953, No. 195, pp. 335–449. Copy in Scientific Library.

General Electric Thermistor Manual, No. TH–13A, published by General Electric, Metallurgical Products Department, Detroit, Michigan, August 15, 1956, pages 8 and 10.